March 7, 1950  J. B. ARMITAGE  2,499,842
MILLING MACHINE

Filed Nov. 23, 1945  2 Sheets-Sheet 1

Inventor
Joseph B. Armitage
By W. D. O'Connor
Attorney

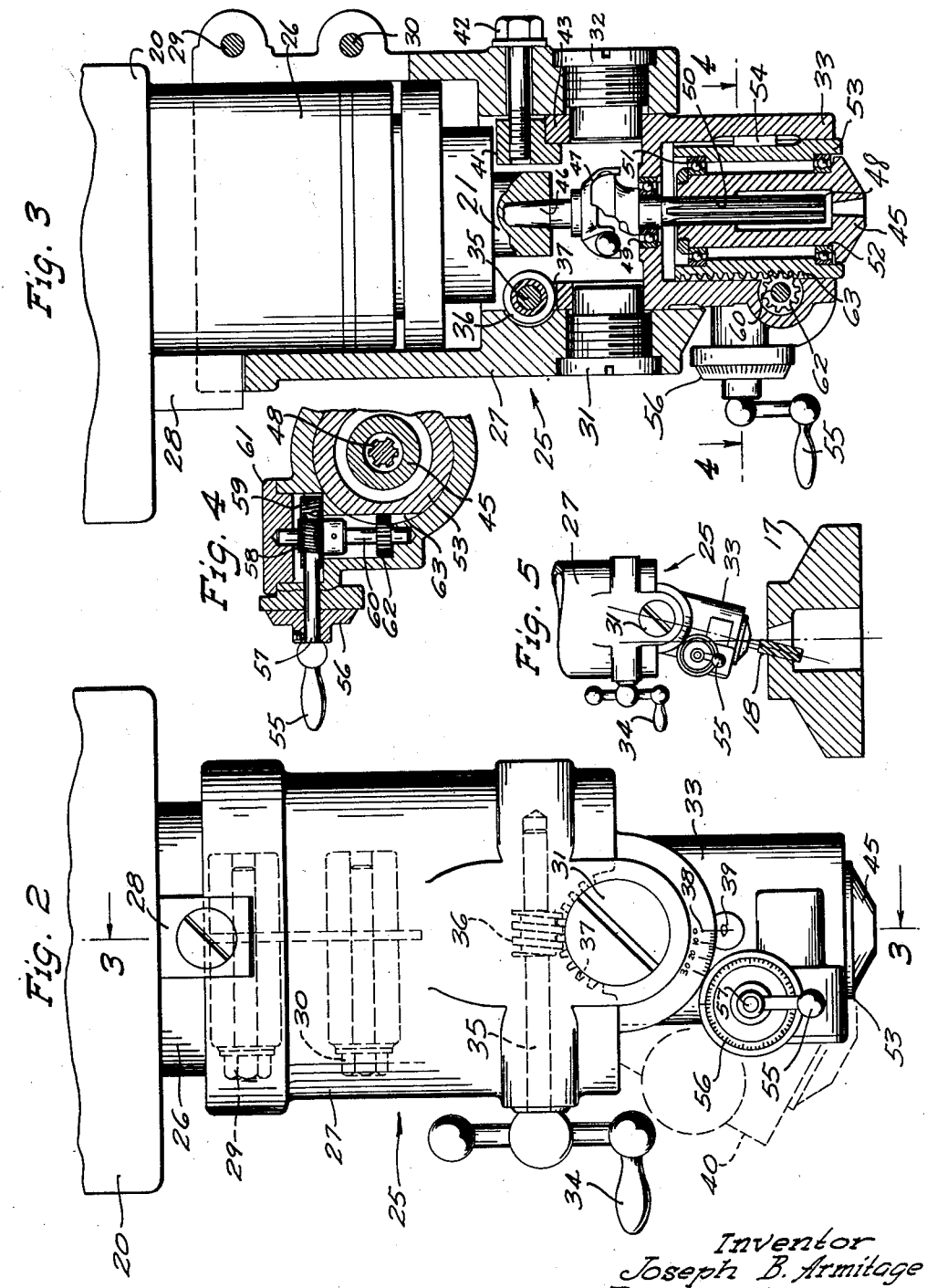

Patented Mar. 7, 1950

2,499,842

UNITED STATES PATENT OFFICE 2,499,842

MILLING MACHINE

Joseph B. Armitage, Wauwatosa, Wis., assignor to Kearney & Trecker Corporation, West Allis, Wis., a corporation of Wisconsin Application November 23, 1945, Serial No. 630,275

8 Claims. (Cl. 90—15)

This invention relates, generally, to milling machines, and more particularly to an improved milling machine especially adapted to perform intricate angularly related machining operations on dies and similar workpieces.

A general object of the invention is to provide an improved milling machine adapted to perform milling operations of an intricate angular character.

Another object of the invention is to provide means for selectively setting angularly a milling spindle adapted to move bodily along a selected circular path.

Another object is to provide improved means for angularly adjusting a machine tool spindle together with means for adjusting the spindle axially.

According to this invention, a milling machine is provided with means to effect bodily gyration of the spindle on a selected radius, together with means to selectively adjust the tool retaining spindle angularly. To this end, the power driven machine spindle is journalled in the machine quill and disposed for selective radial adjustment on the cross slide of a rotary head. An auxiliary tool retaining spindle is pivotally connected to the machine spindle and journalled in an axially adjustable quill. This quill in turn, is retained in an angularly adjustable carrier so arranged that when the carrier is adjusted to a desired angle, a cutter fastened in the spindle may be caused to operate upon a workpiece at a selected angle. Any desired arcuate or circular movement of the tool spindle may be generated through the operation of the rotary head. When the cross slide is moved across the face of the rotary head with the guideways set at a predetermined angle, the cutter may be caused to effect a desired rectangular or angular cutting operation, while in an inclined position. The combination of the two operations serves to effect milling cuts upon a workpiece of an intricate angular character.

The foregoing and other objects of this invention, which will become more fully apparent from the following detailed specification, may be achieved by the exemplifying structure depicted in and described in connection with the accompanying drawings, in which:

Fig. 2 is an enlarged view of the spindle carrying apparatus shown in Fig. 1;

Fig. 3 is an enlarged sectional view of the spindle apparatus shown in Figs. 1 and 2, taken substantially on the line 3—3 in Fig. 2;

Fig. 4 is a detailed view in horizontal section of the quill adjusting mechanism, taken along the plane of the line 4—4 in Fig. 3; and Fig. 5 is a general view in elevation of the spindle apparatus, showing the cutting tool operating upon a workpiece.

Figure 1:
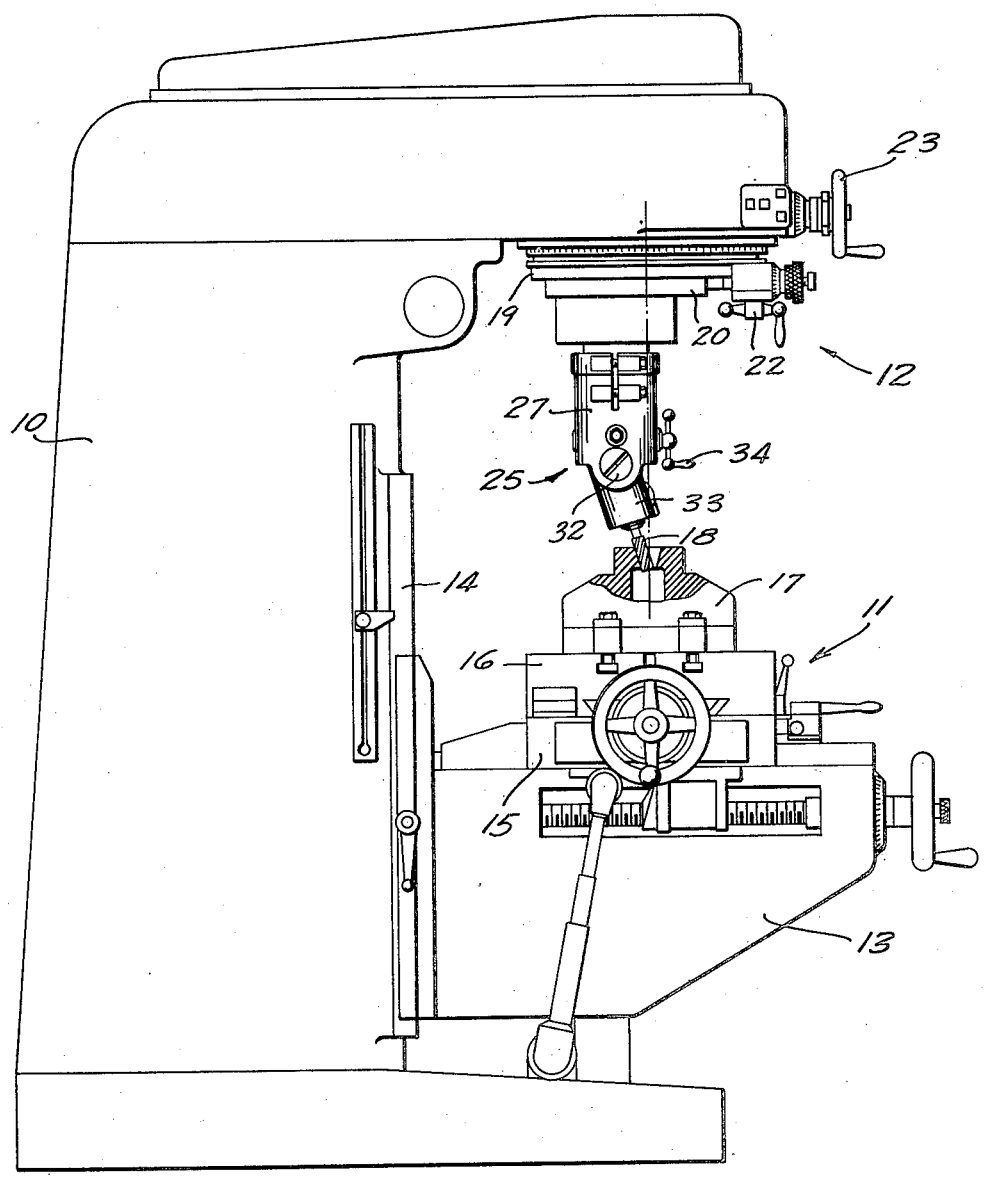
Figure 1 is a general view in left side elevation of a milling machine with a special cutter spindle carrying apparatus constituting a preferred embodiment of the novel features of the invention.

The milling machine shown in Fig. 1 of the drawings as exemplifying structure incorporating a preferred embodiment of the invention is essentially a vertical spindle, rotary head milling machine of the knee type, such as is fully shown and described in Patent No. 2,379,405, issued July 3, 1945 to Joseph B. Armitage.

Referring to the drawings, and more particularly to Fig. 1 thereof, the milling machine there shown comprises essentially a supporting frame or column 10 carrying a work supporting structure 11 and a tool supporting structure 12 mounted thereon in cooperating relationship. The work supporting structure 11 includes a knee 13 slidably mounted for vertical movement on ways 14 on the front of the column 10, a saddle 15 slidably disposed on the top of the knee 13, and a work supporting table 16 mounted for longitudinal movement on the saddle 15. A workpiece such as the part 17 clamped on the table 16 may be selectively positioned in three transverse planes by effecting movements of the knee, saddle and table in a well known manner.

The tool supporting structure 12 is mounted on the top of the column 10 and presents a cutting tool 18 in cooperating relationship with the workpiece 17 clamped on the table 16, as is more fully described in the aforementioned patent. The tool supporting structure 12 includes a rotary head 19 carrying a cross slide 20 slidably mounted thereon. The rotary head 19 is journalled in the column for rotation about a vertical axis, a selectively operable manual or power driven means being provided to effect rotation thereof. A vertically disposed machine spindle 21, as shown in Fig. 3, is carried in the cross slide 20 and is rotatably driven from a power source (not shown) contained within the column 10. The arrangement is such that the axis of rotation of the rotary head 19 is parallel with the axis of the spindle 21 and, consequently, rotation of the head 19 will revolve or gyrate the spindle 21 bodily in a circular path in a horizontal plane.

The machine spindle 21 is rotatably mounted in a depending portion of the radially adjustable cross slide 20, which may be positioned as required along the diameter of the rotary head 19. For the selective adjustment of the slide 20, a hand crank and screw mechanism 22 journalled in the head 19 and operatively connected to the slide 20 is provided. Thus, the spindle 21 may be precisely positioned radially with respect to to the axis of the rotary head 19. Another hand crank 23 is provided for effecting manual rotation of the head 19 and automatic control means (not shown) are provided to selectively control power actuated rotation of the head through any portion of a circle at any one of a plurality of feed rates.

In accordance with the present invention, means are provided for adjusting the angular position of the cutter 18 in combination with the radial bodily adjustment thereof. By this arrangement, the cutter may be revolved bodily, while in an adjusted angular position, or fed along an angularly positioned straight line by the operation of the cross slide 20 while disposed at any selected angle. For example, by imparting a revolving motion to the cutter in a horizontal plane while it is rotating and is disposed at a predetermined angle, the cutter may be caused to form a tapered hole or recess in the workpiece 17, such as those shown in Figs. 1 and 5.

The angular adjustment of the cutter is accomplished by means of a spindle head mechanism in the form of an attachment 25, clamped to a downwardly projecting cylindrical end 26 of the depending cross slide member 20, as shown in Figs. 1, 2, and 3. The attachment comprises a hollow frame member 27, provided with a machined bore having a slightly larger diameter than that of the extending cylindrical end 26 of the cross slide 20. The member 27 is precisely positioned on the slide member 20 through engagement with a locating block 28 bolted to the upper end of the slide (see Figs. 2 and 3). Two clamping screws 29 and 30 bridging a kerf in the frame 27 serve, when tightened, to securely fasten the frame to the extending end 26 of the cross slide. Thus, the two members are clamped together to provide for unitary movement thereof.

A pair of trunnion pins 31 and 32 are threadably retained in the respective sides of the frame member 27 and serve to pivotally carry an angularly adjustable tool spindle carrier 33. Pivotal movement of the carrier 33 on the trunnions is effected by the manipulation of a handle 34, which is keyed to the outer end of a shaft 35 journalled transversely in the frame member 27. As shown in Figs. 2 and 3, a worm 36, keyed to the inner end of the shaft 35 meshes with a worm wheel segment 37 machined on an arcuate flange of the spindle carrier 33 above the trunnion 31. A scale 38 on the frame 27, when read against a zero mark 39 on the carrier 33, affords the machine operator a readily available means for ascertaining the angular setting of the carrier with respect to the vertical axis of the machine spindle 21. The dotted outline 40 in Fig. 2 shows the extent to which the spindle carrier 33 may be angularly positioned through operation of the handle 34. Since the worm 36 and segment 37 are self-locking, as long as the handle 34 remains undisturbed, the spindle carrier 33 will remain locked in its assumed position. However, an additional positive locking device is provided to retain the spindle carrier rigidly in any adjusted position. For this purpose a clamping shoe 41, retained by a bolt 42, engages an arcuate flange 43, integrally formed on the carrier 33 above the trunnion 32. When the bolt 42 is tightened, the shoe 41 moves to the right, as viewed in Fig. 3, to clamp the flange 43 and, consequently, lock the spindle head mechanism 25 in the adjusted angular position.

The cutter 18 is mounted in a secondary tool carrying spindle 45 that is operatively mounted in the spindle carrier 33 and is arranged to be rotatably driven from the machine spindle 21, as shown in Fig. 3. When the frame member 27 is placed upon the downwardly extending end 26 of the cross slide 20, a tapered shaft 46 carried within it and having formed integrally therewith the upper half of a universal joint 47 is fitted into and locked in the correspondingly tapered lower end of the machine spindle 21 in a well known manner. The lower half of the universal joint 47 is integrally formed with a splined shaft 48 that is operably supported by a bearing 49 mounted in the carrier 33.

The splined shaft 48 has sliding engagement with an internally splined bore 50 in the tool retaining spindle 45, the spindle being retainably journalled in two bearings 51 and 52, set in a quill 53 arranged for axial adjustment. The quill 53 is, in turn, slidably retained in the spindle carrier 33 in axial alignment with the shaft 48 and is restrained against rotation by a key 54. With this arrangement, the spindle 45 is operably driven from the machine spindle 21 by means of the universal joint connecting it to the shaft 48 in any adjusted axial and angular position.

As shown in Figs. 3 and 4, the quill 53 is provided with means to effect the precise longitudinal adjustment thereof. The initial positioning of the workpiece 17 in relation to the cutter 18 is accomplished by positioning the machine knee, saddle and table. while the final adjustment and subsequent feeding movements may be made by effecting an axial quill and spindle adjustment. Movement of the quill 53 and spindle 45 is effected by rotating a small crank handle 55, disposed on the side of the spindle carrier 33. The handle 55 is cooperatively associated with a dial 56 and is mounted on the end of a horizontally projecting shaft 57. As shown in Fig. 4, the shaft 57 is journalled in the spindle carrier 33 and has keyed to it a worm 58 which, in turn, meshes with a worm wheel 59, fixedly carried on a shaft 60. The shaft 60 is disposed transversely of the shaft 57 with one end journalled in a removable cap 61 that is provided to facilitate the assembly of the quill adjusting mechanism. A gear 62, keyed to the shaft 60, meshes with rack teeth 63, disposed longitudinally on the periphery of the quill 53. Thus, when the crank 55 is rotated, the quill assembly 53 is fed axially to position the cutter 18 in relation to the workpiece 17 or to feed it along the angular path as the work progresses. The dial 56, bearing appropriate indicia, enables the machine operator to make precise axial spindle adjustments, and since the worm 58 and worm wheel 59 are self-locking, the spindle will remain in the adjusted position.

With this arrangement, the milling machine can be set up to perform an intricate cutting operation wherein the cutter is adjusted to operate at a predetermined angle and the cutter and spindle is bodily gyrated to perform the angular cutting operation along a selected arcuate path. Or, by actuating the spindle cross slide, the machine may be made to perform an angular cutting operation along a prescribed secondary angular path.

Although the apparatus shown in the drawings has been detailedly described, for the purpose of fully setting forth a machine embodying the invention, it is to be understood that the structure herein described is intended to be illustrative only, and that the various novel features of the invention may be incorporated in other structural forms, without departing from the spirit and scope of the invention, as defined in the subjoined claims.

The principles of the invention having now been fully explained in connection with the foregoing description of an illustrative preferred embodying structure, I hereby claim as my invention or discovery:

1. A machine tool comprising a frame, a work supporting structure operably mounted on said frame, a tool supporting structure rotatably mounted in said frame, a quill block slidably carried by said tool supporting structure, a quill operably mounted in said block, a spindle journalled in said quill, a power source connected to drive said spindle, a tool receiving spindle flexibly jointed to and driven by said first-mentioned spindle, means to angularly set said tool receiving spindle selectively relative to the axis of said first-mentioned spindle, and means to precisely adjust said tool receiving spindle axially whereby a milling cutter carried by said spindle may be adjusted to cut a configuration of a predetermined conical shape upon a workpiece retained on said work supporting member.

2. A machine tool comprising a work supporting structure, a tool supporting structure mounted for rotary movement relative to said work supporting structure, a slide operably retained for radial adjustment in said rotatable tool supporting structure, a drive spindle journalled in said slide, a universal joint connected to said spindle, a tool receiving spindle driven by said drive spindle through operation of said joint, a quill rotatably supporting said tool receiving spindle for axial adjustment, and means to adjustably position said quill and spindle angularly relative to the axis of rotation of said drive spindle whereby said tool spindle may be adjustably positioned angularly, axially and radially relative to said work supporting structure.

3. In a milling machine having a rotatable machine spindle mounted for bodily gyratory movement, a tool supporting spindle connected to be driven by said rotatable machine spindle and arranged to be adjusted angularly relative to the plane of gyration of said machine spindle, and means for feeding said angularly adjustable tool spindle axially while it is gyrating, whereby a workpiece may be machined by a milling cutter mounted in said tool spindle to form a frusto-conical surface.

4. In an angular spindle attachment for a machine tool having a main spindle rotatably mounted in a bodily movable spindle quill, a frame adapted to be detachably secured to the spindle quill for movement with it, an auxiliary quill carrier pivotally connected to said frame for angular adjustment in the plane of the axis of the spindle, a worm and wormwheel adjusting mechanism operatively connected to effect angular adjustment of said quill carrier, an auxiliary quill slidably mounted in said quill carrier for axial adjustment therein, a rack and pinion mechanism operatively connected to effect axial adjustment of said auxiliary quill within said carrier, an auxiliary cutter spindle rotatably mounted in said auxiliary quill, a spindle driving shaft having splined connection with said auxiliary spindle, and a universal joint mechanism operatively connecting said splined shaft to the main spindle of the machine, whereby a cutter carried by said auxiliary spindle may be presented at a selected angle to the machine main spindle and advanced axially while being driven by said main spindle and moved bodily with said main spindle quill.

5. In an attachment for a machine tool of the gyratory spindle type having a spindle carrying quill, a frame arranged to be clamped to the spindle quill for movement with it, a spindle carrier pivotally mounted on said frame for angular adjustment from a position of axial alignment with said quill, means to adjust said carrier to the desired angular position, an auxiliary quill slidably mounted in said spindle carrier for axial adjustment, an auxiliary cutter carrying spindle rotatably mounted in said auxiliary quill, and a universal joint shaft interconnecting said auxiliary spindle with the main gyratory spindle of the machine, whereby a tool in said auxiliary spindle may be rotated while being gyrated to form a conical surface of selected slope and simultaneously fed along said surface as it is being formed.

6. In a machine tool of the type having a tool spindle carried by a head mounted for gyratory movement, a frame detachably secured to said head, a spindle carrier pivotally mounted on said frame for angular adjustment from axial alignment with said machine tool spindle, an auxiliary cutter carrying spindle rotatably mounted in said spindle carrier, and a universal joint mechanism operatively connecting said auxiliary spindle to said machine tool spindle, whereby a cutter carried by said auxiliary spindle may be presented to a workpiece at a predetermined angle while being rotated from said tool spindle through operation of said universal joint and being gyrated relative to the workpiece through gyratory movement of said spindle head.

7. In a machine tool of the gyratory cutter type, a rotatably mounted cutter head, a spindle slide movably mounted on said head for radial adjustment, a power driven machine spindle rotatably mounted in said spindle slide for gyratory movement, a spindle carrier pivotally carried by said slide for angular adjustment, a cutter carrying spindle rotatably mounted in said spindle carrier, and power transmitting means operatively connecting said machine spindle to said cutter spindle for driving it regardless of the angular adjustment of said spindle carrier, the arrangement being such that a cutter carried by said cutter spindle may be presented at a desired angle while being gyrated upon a predetermined radius through rotation of said cutter head and driven by power from said machine spindle.

8. In an angularly adjustable spindle attachment for a machine tool having a machine spindle rotatably mounted in a bodily movable spindle head, a frame adapted to be detachably secured to said movable spindle head, a quill carrier pivotally connected to said frame for angular adjustment relative thereto, actuating mechanism operatively connected to effect angular adjustment of said quill carrier, a quill slidably mounted in said quill carrier for axial adjustment therein, actuating mechanism operatively connected to effect axial adjustment of said quill within said carrier, a cutter spindle rotatably mounted in said quill for axial adjustment with it, and axially extensible and angularly flexible driving mechanism operatively connected to said cutter spindle and connected for actuation by said machine spindle, whereby a cutter carried by said cutter spindle may be driven by said machine spindle while presented at a selected angle and movable bodily with said spindle head.

JOSEPH B. ARMITAGE.

REFERENCES CITED

The following references are of record in the file of this patent:

UNITED STATES PATENTS

| Number | Name | Date |
|---|---|---|
| 1,720,712 | Armitage | July 16, 1929 |
| 2,153,424 | MacRae | Apr. 4, 1939 |
| 2,286,821 | Libby | June 16, 1942 |

FOREIGN PATENTS

| Number | Country | Date |
|---|---|---|
| 827,283 | France | Jan. 24, 1938 |